(12) United States Patent
Desai

(10) Patent No.: US 11,704,201 B2
(45) Date of Patent: Jul. 18, 2023

(54) FAILURE RECOVERY IN A SCALEOUT SYSTEM USING A MATRIX CLOCK

(71) Applicant: Dell Products L.P., Round Rock, TX (US)

(72) Inventor: Keyur B. Desai, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/456,993

(22) Filed: Nov. 30, 2021

(65) Prior Publication Data

US 2023/0168972 A1    Jun. 1, 2023

(51) Int. Cl.
| | |
|---|---|
| G06F 11/00 | (2006.01) |
| G06F 11/14 | (2006.01) |
| G06F 11/16 | (2006.01) |
| G06F 11/07 | (2006.01) |

(52) U.S. Cl.
CPC ...... *G06F 11/1469* (2013.01); *G06F 11/0772* (2013.01); *G06F 11/1451* (2013.01); *G06F 11/1464* (2013.01); *G06F 11/1604* (2013.01); *G06F 2201/84* (2013.01)

(58) Field of Classification Search
CPC ............. G06F 11/1469; G06F 11/0772; G06F 11/1451; G06F 11/1464; G06F 11/1604; G06F 11/0709; G06F 11/1446; G06F 11/1471; G06F 2201/84
See application file for complete search history.

(56) References Cited

U.S. PATENT DOCUMENTS

| | | | |
|---|---|---|---|
| 10,621,049 B1* | 4/2020 | Certain | G06F 11/1466 |
| 2015/0172412 A1* | 6/2015 | Escriva | H04L 67/10 |
| | | | 709/202 |
| 2020/0151163 A1* | 5/2020 | Aron | G06F 16/2365 |
| 2021/0018953 A1* | 1/2021 | Ford | G06F 1/10 |
| 2022/0253363 A1* | 8/2022 | Zhang | G06F 11/1469 |

OTHER PUBLICATIONS

Singh et al., An efficient implmentation of matrix clocks in the distributed computing environment, 2015 International Conference on Green Computing and Internet of Things (ICGCIoT), IEEE Xplore, 2015, pp. 275-279 (Year: 2015).*

\* cited by examiner

*Primary Examiner* — Joseph D Manoskey
(74) *Attorney, Agent, or Firm* — Workman Nydegger

(57) ABSTRACT

One example method includes performing failure recovery operations in a computing system using matrix clocks. Each node or process in a computing system is associated with a matrix clock. As events and transitions occur in the computing systems, the matrix clocks are updated. The matrix clocks provide a chronological and casual view of the computing system and allow a recovery line to be determined in the event of system failure.

20 Claims, 6 Drawing Sheets

FAILURE RECOVERY IN A SCALEOUT SYSTEM USING A MATRIX CLOCK

FIELD OF THE INVENTION

Embodiments of the present invention generally relate to scaleout operations. More particularly, at least some embodiments of the invention relate to systems, hardware, software, computer-readable media, and methods for failure recovery operations in systems including scaleout systems.

BACKGROUND

Computing systems that expand capacity by adding nodes are examples of distributed scaleout systems. One characteristic of distributed scaleout systems is that they may suffer from failure. As a result, it is often necessary to include redundancy to keep failures transparent. Sometimes, it is necessary to replace or repair a node. On some occasions, it is necessary to perform a repair and then pickup from a point or state that existed prior to the failure. Picking up from a previous state or point of time may require the system to rollback to that state before moving forward. This process is known as a failure recovery.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
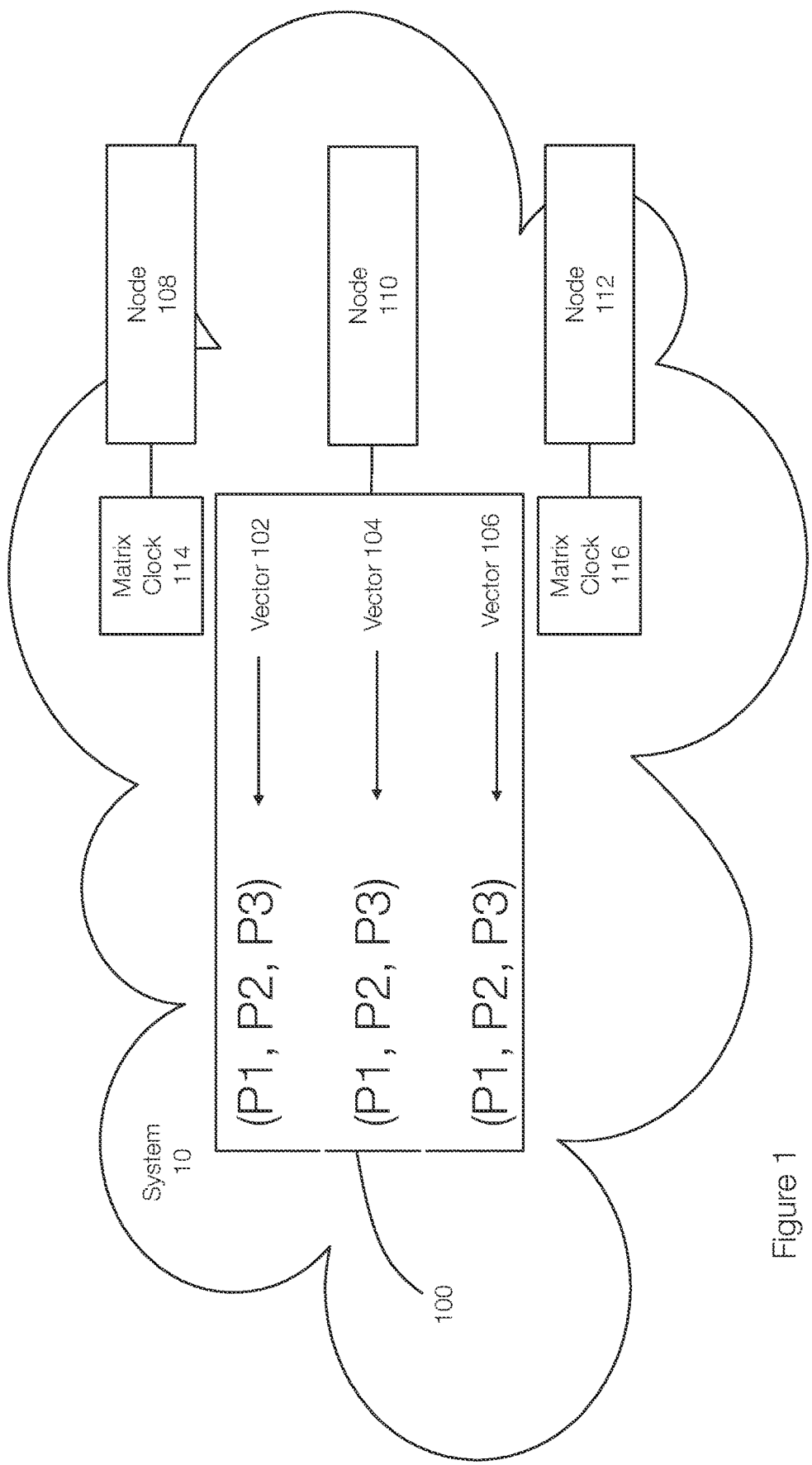
FIG. 1 discloses aspects of a matrix clock in the context of a distributed scaleout system.

Embodiments of the present invention generally relate to distributed scaleout systems. More particularly, at least some embodiments of the invention relate to systems, hardware, software, computer-readable media, and methods for failure recovery in scaleout systems. In general, example embodiments of the invention further relate to scaleout operations, recovery operations, logical clock operations, or the like or combination thereof.

In a distributed system, it is often unnecessary to know when an event happened in a global context. This is difficult using physical clocks because synchronizing physical clocks in a distributed system is expensive and inherently inaccurate. Instead of using a physical time, it is often more useful to know the order of events. In some examples, it is only necessary to know the order of certain events, such as those visible to a particular host or node.

Embodiments of the invention provide a logical or matrix clock. Each node in a distributed scaleout system may be associated with a matrix clock. A matrix clock is a combination of multiple vector clocks. Every time an event occurs, the sending host informs other hosts of what it knows about the global state of time and what other hosts have told the sending host about the global state of time.

Embodiments of the invention include performing failure recovery operations using a matrix clock. By way of example and not limitation, embodiments of the invention are discussed in the context of failure recovery using snapshots and logging. Snapshots involve saving the state of a process. In distributed scaleout systems, and multiple snapshots may be performed. The snapshots may be performed at different nodes at different times. Logging involves recording the operations that produced the current state such that the operations can be repeated or replayed if necessary. For example, a log can be replayed to move a node or process forward in time. Nodes or processes can also be rolled back to previous snapshots or to other points in time.

For example, a node in a cluster may fail. That cluster may be restored to a previous state or rolled back to a previous state using a snapshot. The log is then used to repeat actions that were performed between the previous state and the point of failure. This may include replaying RPCs/messages that may have been sent to other systems.

In this scenario, the other nodes in the cluster must be able to tolerate the RPCs/messages being replayed, such as might be the case for idempotent operations. The other nodes may detect these operations and discard them. If the nodes are unable to tolerate the replayed messages, the other nodes must also rollback to a prior state.

A cascading rollback occurs when the rollback of one node or system causes another node or system to roll back to a prior state. Eventually, the nodes will reach a state where they can move forward together. This state is referred to as a recovery line. After a failure, nodes in a cluster may need to rollback to a recovery line. Embodiments of the invention allow the recovery line to be determined in distributed scaleout system using a matrix clock.

Distributed processes or algorithms (e.g., resource synchronization) that operate on distributed systems may need a way to order events in order to function. For example, consider a system with two processes and a disk. The processes send messages to each other and also send messages to the disk requesting access. The disk grants access in the order the messages were received.

In one example, the first process sends a message to the disk requesting write access and the first process then sends a message to the second process with a read instruction. The second process receives the message from the first process and, as a result, sends a read request message to the disk. If there is a timing delay causing the disk to receive both messages at the same time, the disk may not be able to determine which message happened first. A logical or matrix clock may be used to determine the order of such messages or events.

Causality (causation or cause and effect) describes the manner in which one event, process, state or object (the cause) contributes to the production of another event, process, state or object (the effect). The cause is partly responsible for the effect and the effect is partly dependent on the cause. In general, a process has many causes (causal factors), which are all in the past. An effect can, in turn, be a cause of or a causal factor for other effects, which are all in the future. The cause and effect can be understood, at least in part, using a matrix clock.

A matrix clock is a mechanism to capture chronological and causal relationships in a scaleout system. A matrix clock maintains a vector of the matrix clocks for each communicating node. Each time a message is exchanged, which may be in response to an event, the sending node sends not only what it knows about the global state of time, but also the state of time that the sending node received from other nodes in the distributed system.

FIG. 1 discloses aspects of a matrix clock in a scaleout computing system. FIG. 1 illustrates an example of a matrix clock 100 by way of example and not limitation. In this example, the system 10 includes at least three nodes 108, 110, and 112. Each of the nodes 108, 110, 112 represents a server, a virtual machine, a container, a machine, a process or the like. The nodes 108, 110, and 112 are part of a scaleout computing system 10. The system 10 may be implemented on-site, in a cloud system, a datacenter, multiple cloud systems, or the like or combination thereof.

The matrix clock 100 is associated with the node 110. The nodes 108 and 112 are also associated with, respectively, matrix clocks 114 and 116. The contents of the matrix clock 100 may be different from the content of the matrix clocks 114 and 116.

The matrix clock 100 is representative of all matrix clocks in the system 10. Generally, the matrix clock 100 includes an entry for each node in the system 10. Thus, the size or number of entries in the matrix clock 100 may change as nodes are added/removed from the system 10. However, the matrix clock 100 may also retain information for removed nodes at least for some period of time.

In this example, matrix clock 100 pertains to the node 108. The matrix clock 100 includes a principal vector 104 and supporting vectors 102 and 106. The supporting vectors are principal vectors from the other nodes. However, the supporting vectors in the matrix clock 100 may not reflect the contents of the actual principal vector for the corresponding node. More specifically, the vector 102 corresponds to a principal vector in the matrix clock 114. However, the actual values in the principal vector of the matrix clock 112 may differ from the values in the vector 102.

Depending on the events in the system 100, the number of supporting vectors may vary and the values stored in each of the vectors change. For example, the vector 106 may be missing or empty in the matrix clock 100 until the node 112 communicates with the node 110 (e.g., in response to an event at the node 112).

Each position in a vector pertains to one of the other nodes. Thus, the vector 102 include an entry for each of nodes 108, 110, and 112 represented, respectively, by P1, P2 and P3. The other vectors are similarly configured. Each vector in each matrix clock has an entry for the nodes in the computing system in one example. By way of example and not limitation, the vectors in the matrix clock are arranged in an order that may reflect the manner in which nodes were added to the distributed system. Thus, the matrix clock 100 indicates that the node 108 was the first node. The nodes 110 and 112 were subsequently added to the distributed scaleout system 10.

Figure 2:
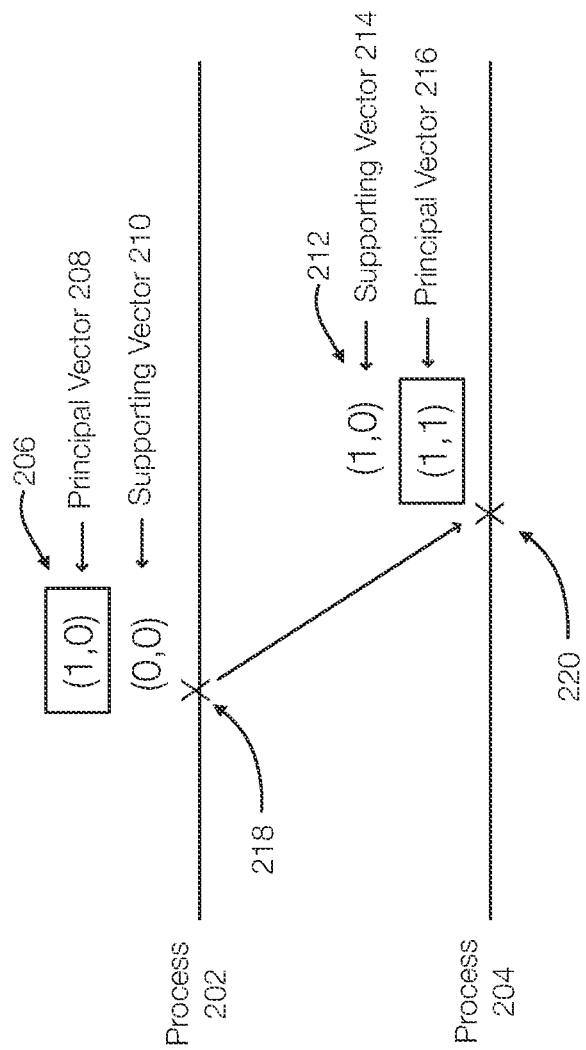
FIG. 2 discloses aspects additional aspects of a matrix clock.

FIG. 2 illustrates an example of matrix clocks configured to capture chronological and/or causal relationships in a scaleout system. FIG. 2 illustrates a process 202 and a process 204. The process 202 may be operating on a node (e.g., a server, virtual machine, container) and the system may need to scaleout and add another node. The node is added and the process 204 is executed on the newly added node.

The process 202 is associated with a matrix clock 206, which includes a principal vector 208 and a supporting vector 210. In this example, the principal vector 208 is (1,0). The "1" represents an event 218 for the process 202. The "0" in the vector 208 indicates that the process 202 has not received any events or messages from the process 204.

The supporting vector 210 for the process 202 is (0,0). The 0s indicate that there are no events on the process 204 or messages from the process 204 that the process 202 is aware of.

In this example, an event 218 occurs (e.g., a snapshot) with respect to the process 202 and is communicated to the process 204. The matrix clock 212 is thus updated. The process 204 also experiences an event 220 (e.g., a snapshot) that is later in time than the event 218. As a result of these events, the matrix clock 212 is updated. For example, the supporting vector 214 is updated to (1,0). This represents the global state of the process 202 carried over to the process 204 during transition. Thus, the supporting vector 214 is a copy of the principal vector 208 that was received from the process 202. Subsequent changes to the principal vector 208 may or may not be communicated to the process 204 or updated in the matrix clock 212.

In this example, the principal vector 216 for the process 204 is updated (1,1). The first "1" represents an event (e.g., the event 218) that has been communicated to the process 204 from the process 202. The second "1" in the principal vector 216 represent the event 220 with respect to the process 204.

In effect, the principal vector 208 of a particular node (or process) represents the corresponding node's event and the events of the other nodes that the particular node is aware of. The supporting vectors represent similar information about other nodes that the particular node is aware of. As a result, the clocks at each of the nodes may differ in their content and may depend on which nodes communicated (or transitioned) which events to which nodes.

The arrows between events in FIG. 2 represent, by way of example only, transitions. With regard to FIG. 2, it is assumed that only process 202 is online and a snapshot (event 218) is performed. The time at which the event 218 occurs is identified in the matrix clock 206. At a later time, the process 202 joins the system, which may be a cluster. When the process 204 (or node) joins the system, a snapshot of the process 204 is performed—the event 220. The transition between the snapshot or event 218 and the snapshot or event 220 is identified by the arrows, which a matrix clock at each end of the transition, which matrix clock identifies the change.

Figure 3:
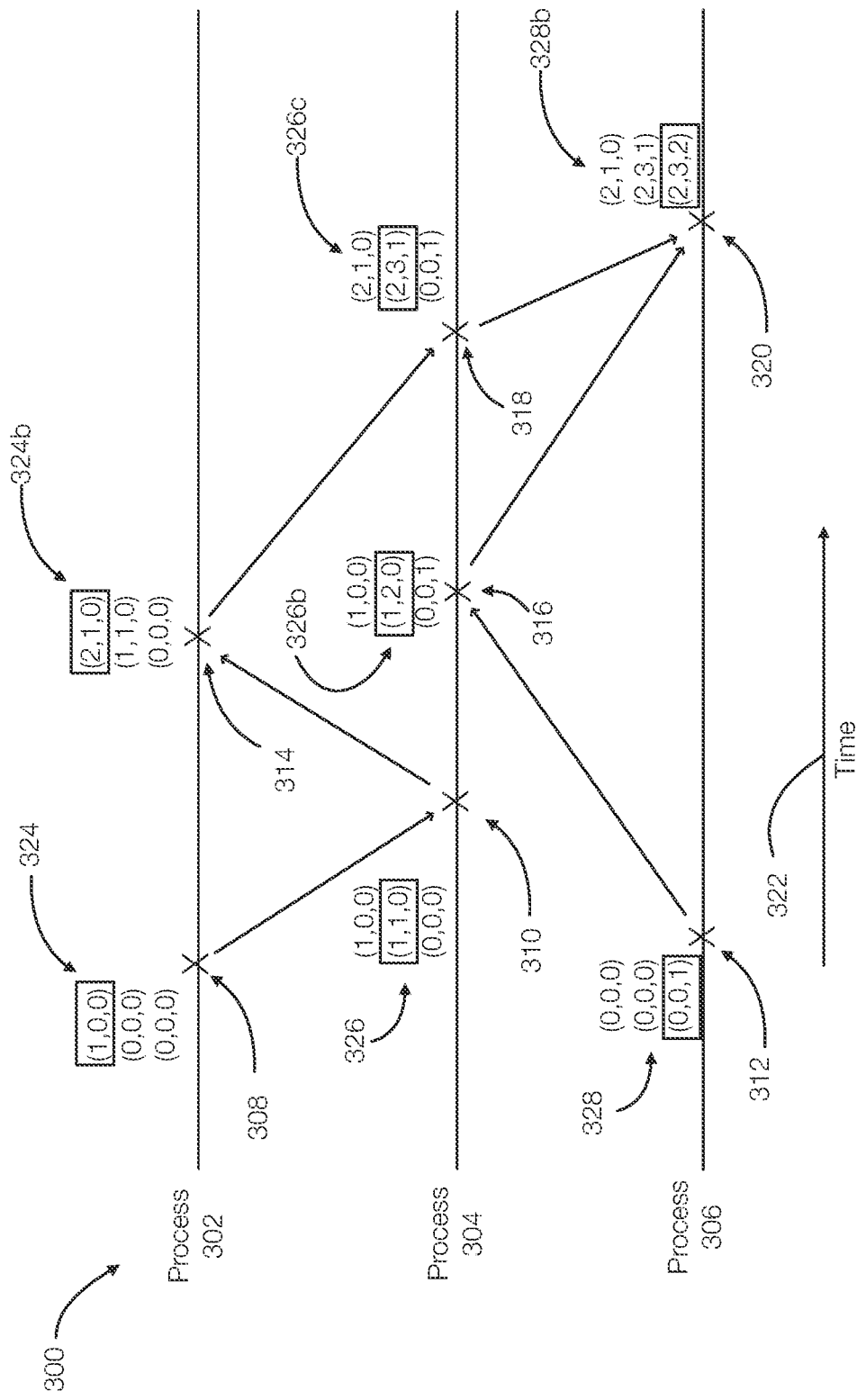
FIG. 3 discloses aspects of managing matrix clocks in a distributed scaleout system.

FIG. 3 discloses aspects of a matrix clock configured to capture casual and/or chronological relationships in a scaleout system. FIG. 3 illustrates a system 300 that includes more nodes or processes compared to FIG. 2. FIG. 3 illustrates processes 302, 304, and 306. The process 302 (process p1) experiences events 308 (event e1) and 314 (event e2). These process/events may be referred to as p1e1 and p1e2. The process 304 similarly experiences events 310, 316, and 318, also referred to as p2e1, p2e2, and p2e3. The process 306 experience events 312 and 320, also referred to as p3e1 and p3e2.

FIG. 3 also illustrates a matrix clock for each of the processes 302, 304, and 306 at different points in time. Thus, the clock 324b reflects the contents of the clock 324 at a later point in time. Similarly, the clocks 326b and 326c represent the contents of the clock 326 at later points in time and the clock 328*b* represents the contents of the matrix clock 328 at a later point in time.

The arrows in FIG. 3 represent transitions and may represent causal relationships. The arrows may also represent messages. For example, the process 302 experiences an event 308 and sends a message to the process 304 or there is a transition to the process 304. The message or transition allows the matrix clock associated with the process 304 to be updated accordingly as discussed below.

FIG. 3 illustrates, with regard to time 322, that the matrix clock 324 associated with the process 302 changes at event 308 (p1e1) and at event 314 (p1e2). The matrix clock 326 associated with the process 304 changes at events 310 (p2e1), 316 (p2e2), and 318 (p2e3). The matrix clock 328 associated with the process 306 changes at the events 312 (p3e1) and 320 (p3e2). The principal vectors in the matrix clocks are outlined in a box for each of the processes.

At event 308 or p1e1, the principal vector in the clock 324 is changed to (1,0,0) reflect the event on the process 302. This event 308 transitions to the process 304. The process 304 then experiences an event 310 (p2e1). The principal vector in the matrix clock 326 is updated to (1,1,0) and the supporting vector corresponding to the process is 302 is updated to (1,0,0). In other words, the matrix clock 304 reflects the state of the process 302 in its matrix clock 326 that is known to the process 304.

A transition is then made to process 302 and an event 314 occurs. The principal vector in the matrix clock 324*b* at event 314 is updated to (2,1,0). The 2 in the principal vector of the clock 324*b* reflects that this is the second event for the process 302 and the 1 reflects that the process 302 is aware of event 310 or the first event on the process 304.

Process 306 experiences an event 312 and the principal vector in the matrix clock 328 is changed to (0,0,1). This reflects the event 312 at the process 306 itself. At this point, the process 306 is not aware of any state of the other processes 302 and 304. Thus, the supporting vectors at the event 312 for the processes 302 and 304 are each (0,0,0). The matrix clock 328 at the time of the event 312 is illustrates that the process 306 is unaware of events on the processes 302 and 304.

When the event 316 occurs, after a transition from the event 312, the matrix clock 326*b* is updated. The supporting vector for process 302 in the clock 326*b* does not change. The principal vector is updated to (1,2,0) to reflect the second event for the process 304 and the supporting vector for the process 306 in the matrix clock 326*b* is updated to reflect the state of the process 306 known by the process 304.

Next, the event 318 occurs, which is related to a transition from the process 302. In this case, the principal vector is updated to (2,3,1) in the matric clock 326*c* and the supporting vector for the process 302 in the matric clock 326*c* is updated to (2,1,0). The supporting vector for the process 306 is unchanged at (0,0,1) because the transition did not occur from the process 306, but was from the process 302.

The last event illustrated in FIG. 3 with respect to time 322 is the event 320. Thus, the primary vector of the matrix clock 328*b* is updated to reflect that this is the second event of the process 306 to (2,3,2). The supporting vectors in the matrix clock 328*b* are updated as discussed.

FIG. 3 illustrates that the matrix clock or clocks can capture chronological relationships as well as causal relationships. Chronological relationships can be captured without using timestamps and without having to synchronize physical clocks across different devices or nodes.

The matrix clocks can be used to determine a recovery line for a system such as a distributed system.

Figure 4:
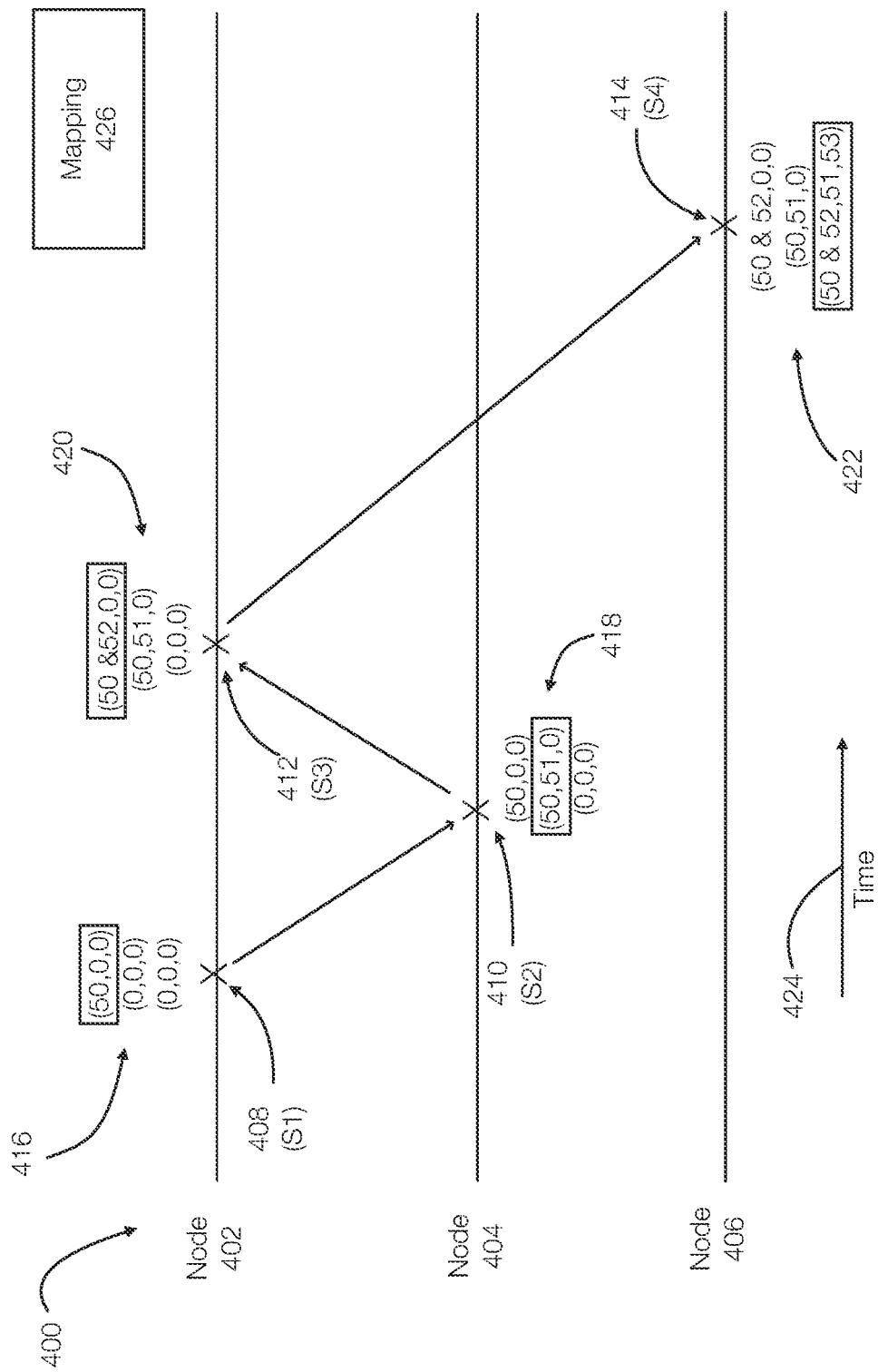
FIG. 4 discloses aspects of a failure recovery operation in a distributed scaleout system using matrix clocks.

FIG. 4 discloses aspects of a failover recovery operation using matrix clocks. FIG. 4 illustrates a scaleout system 400. In the scaleout system 400 (e.g., a cluster), nodes may be added to the cluster as load increases. FIG. 4 illustrates an example of a system that may have a maximum of three nodes. FIG. 4 further illustrates a timeline 424. FIG. 4 further illustrates an example of a process for establishing or determining a failure recovery line using matrix clocks.

Initially, the system 400 includes one node—the node 402. In this example, the node 402 boots at 7:00 am and a snapshot (S1) is performed (e.g., the event 408). The matrix clock 416 associated with the event 408 and the node 402 is updated. More specifically, the principal vector of the matrix clock 416 is updated to (50,0,0). In this example, a monotonically increasing generating number is used to keep track events in the system 400. For the event 408, it is assumed that the generation number starts with 50. Thus, the event 408 is represented in the matrix clock 416 (and other matrix clocks) by the number 50.

The system 400 may also maintain a mapping 426, which may map the event 408 to the generation number to a time. Thus, the mapping for this event 408 may be: 408-50-7:00 am.

At 8:00 am, the load increases to the point that another node (node 404) is required. Thus, the node 404 is booted and a snapshot (S2) is taken (event 410). The event 410 is identified by the generation number 51 in this example. Thus, the matrix clock 418, which is associated with the node 404, is updated. The principal vector of the matrix clock 418 is updated to (50, 51, 0) and the supplemental vector for the node 402 in the matrix clock 418 is updated to (50,0,0).

In this example, a snapshot policy exists to perform a snapshot every 2 hours. As a result, another snapshot (S3) is taken with respect to the node 402. As a result, the primary vector of the matrix clock (now shown as clock 420) is updated to (50&52,0,0). The supplemental vector relative to the node 404 is updated in the matrix clock 420 to (50,51,0).

At 10:00 am, the load on the system 400 increases and another node (the node 406) is added to the system 400. A snapshot (S4) is taken of the node 406 to reflect S4 (the event 414). The generation clock for the event 414 is 53. Thus, the primary vector of the matrix clock 422 is updated to (50&52, 51,53). The supplemental vectors in the matrix clock 422 are both updated from the matrix clock 420 in this example.

This example now assumes that when the snapshot S4 is taken there is a failure in adding the node 406 to the system 400. Subsequently, a failover recovery operation is performed and a recovery line is determined using the matrix clocks.

In one example, the recovery line is determined or established using the matrix clock at the instance or node or event where the failure occurred. In this example, the matrix clock 422, which is associated with the node 406 and the snapshot S4 or event 414 is examined.

The principal vector in the matrix clock 422 is (50&52, 51, 53). This vector represents that 4 snapshots have been performed: 2 on node 402 with generation numbers 50 and 52, one snapshot on node 404 with generation number 51, and one snapshot no node 406 with generation number 53. Using the principal vector in the matrix clock 422, the last known state is the snapshot taken with generation number 52 on the node 402. The system 400 is thus rolled back to that state and the logs are replayed from that point, which is snapshot S3 in this example corresponding to event 412.

More specifically, the principal vector in the matrix clock 422 indicates that the last know state is on the node 402. The replay logs for the snapshot S3, identified from the generation number 52, are present on the node 402 because the snapshot S3 was for the node 402. Because S3 was the last known good state, all nodes in the system 400 are synched to snapshot S3. Thus, the system 400 is rolled back to the snapshot S3.

Next, the logs are replayed on the node 402 in this example. As the logs are replayed from the state represented by the snapshot S3, the error is determined to have occurred at 9:50 am. The node 406, which has been synched to S3 can be rebooted by replaying the logs up to 9:50 am. At this point, the snapshot S4 is dropped and a snapshot (now S5) is performed for the operations until 9:50 am. The matrix clock is updated with a new generation number of 54. The mapping 426 can also be updated with S5-54-9:50 am.

After the snapshot S5 is taken, the principal vector in the matrix clock 414 for the node 406 is (50&52, 51, 54). Thus, generation number 53, like the corresponding snapshot S4, has been dropped or removed. The mapping 426 may be updated with: S5-54-9:50 am.

Thus, the failure recovery line has been established and is represented by the principal vector of (50&52, 51, 54) in the matrix clock.

A similar procedure can be performed for a cascaded rollback. Assume, for example, that as the log on the node 402 was replayed, it is determined that the snapshot S3 (generational number 52) is corrupt. At this point, the system rolls back to the snapshot S2 (generational number 51), which is on the node 404 based on the matrix clock 420. The identification of the next snapshot and its location or node was from the vectors in the matrix clock 420. Once this information (the snapshot S2 and the correct node 404), the nodes 402, 404 and 406 are synched to the snapshot S2 and the logs on the node 404 are replayed from the snapshot S2. More specifically, the logs from the node 404 are replayed because the snapshot S2 was performed on the node 404 and the node 404 stores the logs from the snapshot S2 to the snapshot S3.

As the logs are replayed, the snapshots S3 and S4 (now snapshots 105 and 106, which are associated respectively with generational numbers 55 and 56) are retaken. As the logs are replayed, the matrix clocks are updated, internal references are updated, and a fault recovery line is established. The fault recovery line is now reflected in the principal vector, which is now (50&55, 51, 56).

The principal vectors allow the failure recovery line to be determined and the supporting vectors help validate and/or determine the global state of the system, in terms of chronological and causal relationships in a distributed scaleout system.

Assume, in one example, that a failure was detected on node 404 sometime after event 412 on node 402 and before the event 414. In this example, the rollback process may begin on the node 402 using the matrix clock 420. The rollback is followed until a good snapshot is identified. In this example, this would rollback to the snapshot S2. The nodes would then roll forward from the good snapshot. Snapshots will be discarded and retaken as the logs are replayed.

Figure 5:
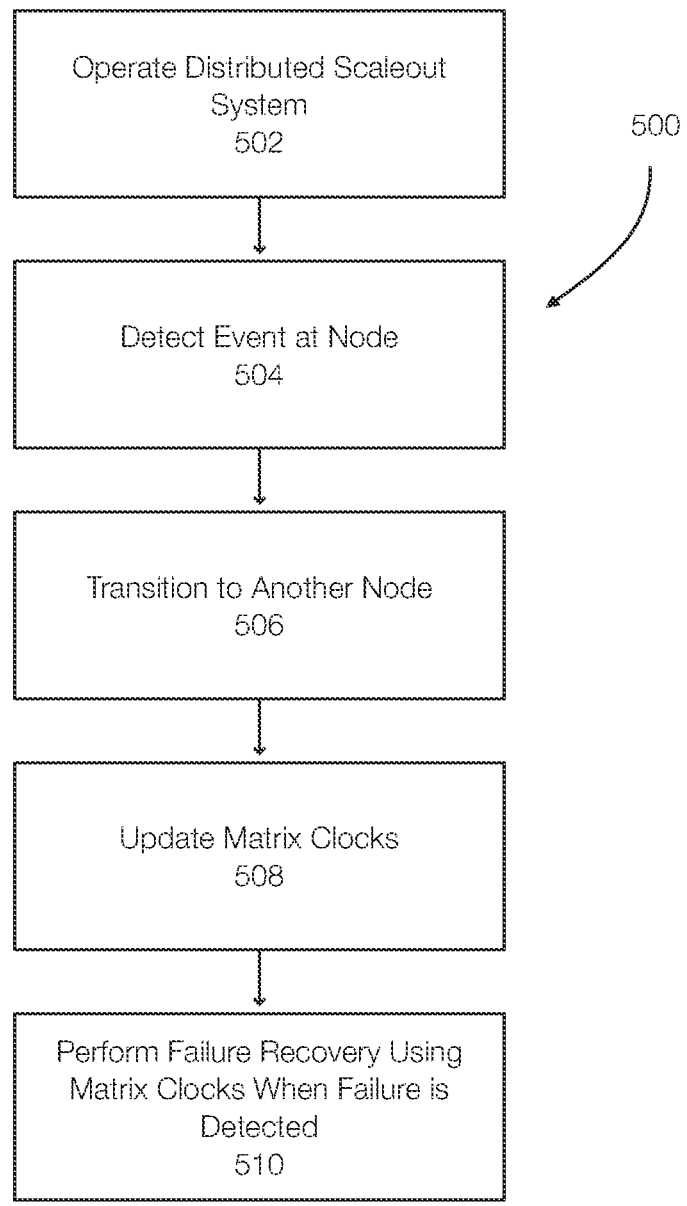
FIG. 5 discloses aspects of a method for failure recovery using matrix clocks.

FIG. 5 discloses aspects of a method for performing operations using a matrix clock in a computing system such as a distributed scaleout system. The method 500 may begin or occur in the context of operating 500 a distributed scaleout system. When operating a distributed scaleout system, resources may be added at various times and for various reasons, such as the need for more resources. Operating the distributed scaleout system may include associating, with each node in the system or with each process in the system, a matrix clock.

During operation of the system, an event may be detected or may occur 504 at a node or a process. The event may be a scheduled event such as a backup operation (e.g., snapshot) or the like. At this point, the available resources on a cluster may saturate and there is a need to scaleout. A second node or process may be added to the cluster to handle resource scaling. Adding a new node may trigger taking a snapshot on the new node. This may trigger matrix clock transition 506 to another node. The transition may be updating the matrix clock on the newly added node, at the time when snapshot was taken on the new node. By way of example only, the transitions referred to herein include transitioning the matrix clock from one node or process to another node or process.

With respect to the event and the transition, matrix clocks at both the source node and the destination node are updated. More specifically, the principal vector at the node at which the event occurred is updated to reflect the event. The supporting vector at the node that receives the transition is updated. If the node that receives the transition also experiences an event such as a snapshot in response to the transition, then the principal vector of that node is also updated accordingly. In this manner, matrix clocks are updated 508.

When an error is detected or for another reason, a failure recovery is performed 510 using the matrix clocks. The matrix clocks provide a chronological and causal view of the system that allows a recovery line to be determined. Thus, the system can rollback to the appropriate snapshot or node or do a cascaded rollback as necessary. The failure recovery can include rolling back to a previous snapshot, synchronizing the nodes to that snapshot, and then rolling forward by replaying logs.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), or containers.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: detecting a first event at a first node in a distributed computing system, updating a first matrix clock associated with the first node, transitioning to a second node in the distributed computing system, detecting a second event at the second node, updating a second matrix clock associated with the second node, detecting a failure in the computing system, and performing a failure recovery in the distributed computing system based on the matrix clocks including the first and second matrix clocks.

Embodiment 2. The method of embodiment 1, further comprising adding the second node to the distributed computing system and performing a snapshot of the second node, wherein the second event comprises the snapshot, wherein transitioning includes transitioning the to the second matrix clock.

Embodiment 3. The method of embodiment 1 and/or 2, wherein the first event comprises a snapshot of the first node.

Embodiment 4. The method of embodiment 1, 2, and/or 3, wherein updating the first matrix clock includes updating a principal vector to reflect the first event.

Embodiment 5. The method of embodiment 1, 2, 3, and/or 4, wherein the principal vector is updated to include a generational number associated with the event.

Embodiment 6. The method of embodiment 1, 2, 3, 4, and/or 5, wherein updating the second matrix clock includes updating a principal vector of the second matrix clock to reflect the second event and updating a supporting vector of the second matrix clock to include a status of the first node.

Embodiment 7. The method of embodiment 1, 2, 3, 4, 5, and/or 6, further comprising detecting a failure at the second node and rolling back to a previous snapshot at the first node based on a principal vector of the second node included in the second matrix clock.

Embodiment 8. The method of embodiment 1, 2, 3, 4, 5, 6, and/or 7, further comprising replaying a log from the first snapshot from the first node.

Embodiment 9. The method of embodiment 1, 2, 3, 4, 5, 6, 7, and/or 8, further comprising synchronizing the first node and the second node to the first snapshot.

Embodiment 10. The method of embodiment 1, 2, 3, 4, 5, 6, 7, 8, and/or 9, further comprising performing a cascaded rollback.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
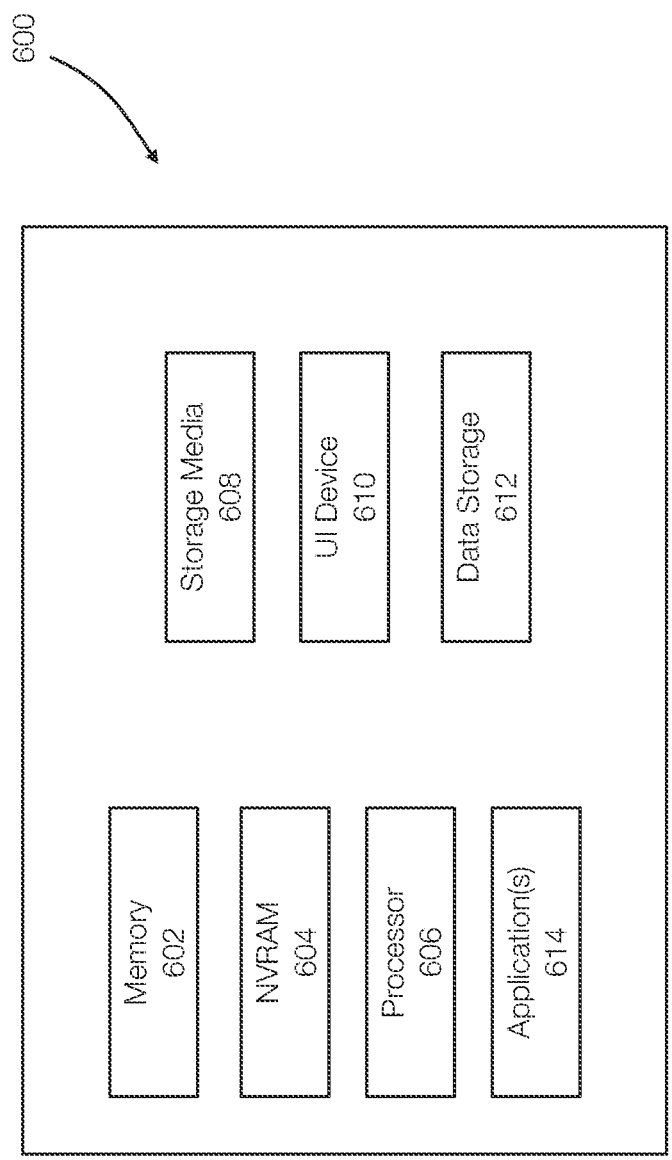
FIG. 6 discloses aspects of a computing device or a computing system.

With reference briefly now to FIG. 6 any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6 the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   detecting a first event at a first node in a distributed computing system;
   updating a first matrix clock associated with the first node;
   transitioning to a second matrix clock at a second node when the second node experiences an event;
   updating the second matrix clock associated with the second node;
   detecting a failure in the computing system; and performing a failure recovery in the distributed computing system based on primary vector of the second matrix clock, wherein the primary vector identifies a failure recovery line.

2. The method of claim 1, further comprising adding the second node to the distributed computing system and performing a snapshot of the second node, wherein the second event comprises the snapshot.

3. The method of claim 2, wherein updating the second matrix clock includes updating a principal vector of the second matrix clock to reflect the second event and updating a supporting vector of the second matrix clock to include a status of the first node.

4. The method of claim 1, wherein the first event comprises a snapshot of the first node.

5. The method of claim 1, wherein updating the first matrix clock includes updating a principal vector to reflect the first event.

6. The method of claim 5, wherein the principal vector is updated to include a generational number associated with the event.

7. The method of claim 1, further comprising detecting a failure at the second node and rolling back to a previous snapshot at the first node based on the principal vector of the second node included in the second matrix clock.

8. The method of claim 7, further comprising replaying a log from a first snapshot from the first node.

9. The method of claim 8, further comprising synchronizing the first node and the second node to the first snapshot.

10. The method of claim 9, further comprising performing a cascaded rollback.

11. A non-transitory storage medium having stored therein instructions that are executable by one or more hardware processors to perform operations comprising:
   detecting a first event at a first node in a distributed computing system;
   updating a first matrix clock associated with the first node;
   transitioning to a second matrix clock at a second node when the second node experiences an event;
   updating the second matrix clock associated with the second node;
   detecting a failure in the computing system; and
   performing a failure recovery in the distributed computing system based on primary vector of the second matrix clock, wherein the primary vector identifies a failure recovery line.

12. The non-transitory storage medium of claim 11, further comprising adding the second node to the distributed computing system and performing a snapshot of the second node, wherein the second event comprises the snapshot.

13. The non-transitory storage medium of claim 12, wherein updating the second matrix clock includes updating a principal vector of the second matrix clock to reflect the second event and updating a supporting vector of the second matrix clock to include a status of the first node.

14. The non-transitory storage medium of claim 11, wherein the first event comprises a snapshot of the first node.

15. The non-transitory storage medium of claim 11, wherein updating the first matrix clock includes updating a principal vector to reflect the first event.

16. The non-transitory storage medium of claim 15, wherein the principal vector is updated to include a generational number associated with the event.

17. The non-transitory storage medium of claim 11, further comprising detecting a failure at the second node and rolling back to a previous snapshot at the first node based on the principal vector of the second node included in the second matrix clock.

18. The non-transitory storage medium of claim 17, further comprising replaying a log from a first snapshot from the first node.

19. The non-transitory storage medium of claim 18, further comprising synchronizing the first node and the second node to the first snapshot.

20. The non-transitory storage medium of claim 19, further comprising performing a cascaded rollback.

* * * * *